(12) United States Patent
Virdi et al.

(10) Patent No.: US 7,743,183 B2
(45) Date of Patent: Jun. 22, 2010

(54) FLOW CONTROL FOR MEDIA STREAMING

(75) Inventors: Gurpratap Virdi, Bellevue, WA (US); Anders E. Klemets, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 385 days.

(21) Appl. No.: 11/135,201

(22) Filed: May 23, 2005

(65) Prior Publication Data

US 2006/0282566 A1 Dec. 14, 2006

(51) Int. Cl.
- G06F 3/00 (2006.01)
- G06F 15/16 (2006.01)
- G06F 13/00 (2006.01)
- G11C 7/10 (2006.01)

(52) U.S. Cl. .............. 710/52; 710/17; 710/34; 710/57; 710/60; 709/234; 711/118; 365/189.05

(58) Field of Classification Search ........... 710/52, 710/17, 34, 57, 60; 709/234; 711/118; 365/189.05
See application file for complete search history.

(56) References Cited

U.S. PATENT DOCUMENTS

| | | | |
|---|---|---|---|
| 5,392,396 A | 2/1995 | MacInnis | |
| 5,621,820 A | 4/1997 | Rynderman et al. | |
| 5,758,076 A | 5/1998 | Wu et al. | |
| 5,844,891 A | 12/1998 | Cox | |
| 5,909,443 A | 6/1999 | Fichou et al. | |
| 6,014,694 A | 1/2000 | Aharoni et al. | |
| 6,343,350 B1 | 1/2002 | LaMaire et al. | |
| 6,378,053 B1 | 4/2002 | Lamaire et al. | |
| 6,507,587 B1 | 1/2003 | Bahl | |
| 6,519,004 B1 | 2/2003 | Bahl | |
| 6,611,530 B1 | 8/2003 | Apostolopoulos | |
| 6,618,363 B1 | 9/2003 | Bahl | |
| 6,757,273 B1 | 6/2004 | Hsu et al. | |
| 6,860,609 B2* | 3/2005 | Olson et al. | 353/122 |
| 7,000,025 B1* | 2/2006 | Wilson | 709/235 |
| 7,151,749 B2 | 12/2006 | Vega-Garcia et al. | |
| 7,155,532 B2 | 12/2006 | Schoenblum | |
| 7,170,856 B1 | 1/2007 | Ho et al. | |
| 7,366,199 B1 | 4/2008 | Vaughan et al. | |
| 2002/0146023 A1* | 10/2002 | Myers | 370/412 |

(Continued)

FOREIGN PATENT DOCUMENTS

EP 0901285 3/1999

(Continued)

OTHER PUBLICATIONS

Douglas E. Comer "Internetworking with TCP/IP", Prentice Hall, 2000, Fourth Edition, p. 220.*

(Continued)

*Primary Examiner*—Niketa I Patel
(74) *Attorney, Agent, or Firm*—Lee & Hayes, PLLC (57) ABSTRACT

A client device receives streaming content from a host device. The streaming content is placed in one or more buffers prior to processing. Monitoring as to the capacity and fullness of the buffers is performed at the client device and information is sent to the host device. The host device adjusts the rate or flow of the streaming content based on the information provided by the client device.

20 Claims, 5 Drawing Sheets

U.S. PATENT DOCUMENTS

| | | | |
|---|---|---|---|
| 2002/0157102 | A1 | 10/2002 | Lee et al. |
| 2003/0055995 | A1 | 3/2003 | Ala-Honkola |
| 2003/0067872 | A1 | 4/2003 | Harrell et al. |
| 2003/0133446 | A1 | 7/2003 | Schoenblum |
| 2003/0165150 | A1 | 9/2003 | Zimmermann et al. |
| 2003/0195977 | A1 | 10/2003 | Liu et al. |
| 2003/0198184 | A1 | 10/2003 | Huang et al. |
| 2004/0193719 | A1 | 9/2004 | Yang et al. |
| 2004/0193762 | A1 | 9/2004 | Leon et al. |
| 2004/0267956 | A1 | 12/2004 | Leon et al. |
| 2005/0021830 | A1 | 1/2005 | Urzaiz et al. |
| 2005/0047341 | A1 | 3/2005 | Kim et al. |
| 2005/0100056 | A1 | 5/2005 | Chuberre et al. |
| 2006/0026181 | A1* | 2/2006 | Glickman .................... 707/100 |
| 2007/0022206 | A1 | 1/2007 | Pope et al. |
| 2007/0150264 | A1* | 6/2007 | Tackin et al. ................. 704/207 |

FOREIGN PATENT DOCUMENTS

| | | |
|---|---|---|
| EP | 0987894 | 3/2000 |
| JP | 08191451 | 7/1996 |
| WO | WO0124523 | 4/2001 |
| WO | WO03026232 A1 | 3/2003 |
| WO | WO03045047 A2 | 5/2003 |
| WO | WO2004008673 A2 | 2/2004 |

OTHER PUBLICATIONS

Castel-Branco et al., "Clock Recovery for Circuit Emulation Services over ATM" Broadband Communications. Global Infrastructure for the Information Age. Conference on Broadband Communications, Canada, 1996, London, Chapman and Hall, GB, Apr. 23, 1998 pp. 617-825.

Cha et al, Dynamic Frame Dropping for Bandwidth Control in MPEG Streaming System Multimedia Tools and Applications 2003 No. 19 pp. 155-178.

Fung et al. "Dynamic Frame Skipping for High-Performance Transcoding" IEEE 2001 pp. 425-428.

Furini et al. "Real-Time Traffic Transmission Over the Internet" IEEE Transactions on Multimedia vol. 3 No. 1 Mar. 2001 pp. 33-40.

Lim et al. "Semantic Transcoding of Video based on Regions of Interest" Proceedings of SPIE 2003 vol. 5150 pp. 1232-1244.

Peter van Beek "Adaptive streaming of high-quality video over wireless LANs" Proceedings of the SPIE 2004 vol. 5308 No. 1 pp. 647-660.

Vertro et al. "Rate-Reduction Transcoding Deisgn for Wireless Video Streaming" IEEE 2002 pp. I-29 to I-32.

Zheng et al. "TSFD: Two Stage Frame Dropping for Scalable Video Transmission over Data Networks" IEEE 2001 pp. 43-47.

Zhong et al. Complexity Regulations for Real-Time Video Encoding IEEE 2002 pp. I-737 to I-740.

Zhou et al. "Optimal Temporal Sampling of Video under Channel and Buffer Constraints" IEEE 2002 pp. 401-404.

Wei, et al., "A Layered Real-time Video Transfer System: Architecture and Its Implementation", ACTA Electronica Sinica, vol. 28, No. 11, Nov. 2000, pp. 153-168.

Yu, H. et al., "Deisgn on internal model controller for flow control on real-time multimedia communication", Journal of China Institute of Communication, vol. 25, No. 11, Nov. 2004, pp. 90-97.

Office Action from the Patent Office of the State Intellectual Property Office of the People's Republic of China, Application No. 200510119935.2, mailed on Dec. 5, 2008, 28 pages.

Office Action from the Patent Office of the State Intellectual Property Office of the People's Republic of China, Application No. 200680017579.6, mailed on Feb. 6, 2009, 12 pages.

US 5,715,404, 02/1998, Katseff et al. (withdrawn)

* cited by examiner

FLOW CONTROL FOR MEDIA STREAMING

TECHNICAL FIELD

This invention relates to digital content systems, and more particularly to regulating the flow of streamed digital content in such systems.

BACKGROUND

Multi-media content or digital content (content) streaming, such as the streaming of audio, video, and/or text media content is becoming increasingly popular. The term "streaming" is typically used to indicate that the content is provided by a server or host device over a network to a client device (i.e., a media playback device implemented as any of a variety of conventional computing devices, such as a desktop PC, a notebook or portable computer, a cellular telephone or other wireless communications device, a personal digital assistant (PDA), a gaming console, an IP set-top box, a handheld PC, and so on). In general, the client device renders (e.g., plays or displays) the streaming content as the content is "simultaneously" received from the host, rather than waiting for all the content or the entire "file" to be delivered.

When content is "streamed" over a network, it is typically streamed in data packets. Such data packets may be in a format defined by a protocol such as real time transfer protocol (RTP), and communicated over another format such as user datagram protocol (UDP). Furthermore, such data packets may be compressed and encoded when. streamed from the host device. The data packets are then decompressed and decoded at the client device.

The data packets may be received by the client device in the order that they are transmitted by the host device; however in certain cases data packets may not be received or received in a different order. Furthermore, there may be some uncertainty as to the rate or flow of received data packets. The data packets may arrive or be received at a faster rate than the client device can render the data packets, or they may not arrive fast enough (i.e., the data packets are not arriving fast enough for the client device to render them). In particular, when streaming is performed, the data packets may not necessarily be transmitted in real-time rate. The data packets may be transmitted faster or slower than real-time rate.

A client device typically uses buffers to store received data packets prior to processing. Such buffers have limited storage and depending on the rate that the packets are received, buffer overflow (from receiving data packets too fast) or buffer underflow (from not receiving data packets fast enough) may occur. If data packets arrive at too fast a rate, client buffers may overflow and data packets may not be processed. If the data packets are not received fast enough or in a timely manner, glitches or breaks are experienced by a user. For example, if multimedia content is streamed to and not received fast enough by the client device, the user sees glitches or breaks in the presented multimedia content. Furthermore, when an overflow or underflow situation is detected, there may be a need to synchronize clocks at the client device and host device in order to correct the problem. Generally, it is already too late to correct the overflow problem after it has already occurred. However, by synchronizing the clocks, the problem may be prevented from occurring again. Or if it is done early enough, it can prevent the problem from occurring. Overflow and underflow may occur for a number of reasons including device clock drift and network congestion.

Accordingly, a need exists to regulate data packet flow or streams from a host device to a client device that may or may not incorporate clock recovery at the host device and the client device.

SUMMARY

Buffer information as to capacity and usage of buffers at a client device is sent to a host device. The buffer information includes capacity of one or more buffers at the client device and how full or utilized the buffers are. The buffer information is sent to the host device which uses such information to adjust the flow of streaming content to the client device.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The following disclosure describes techniques that inform a host device as to status of client device buffers that receive screened content for processing.

Figure 1:
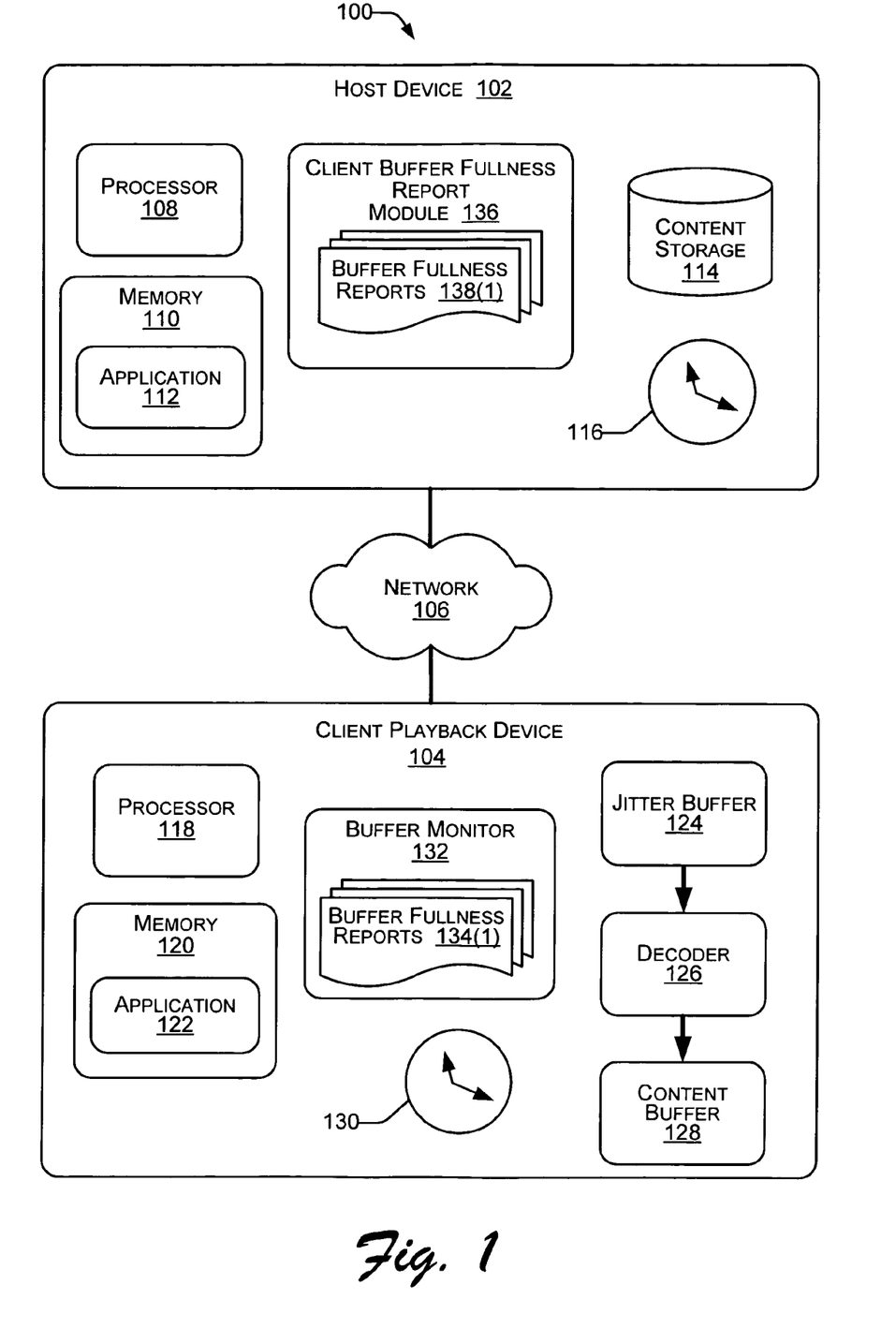
FIG. 1 illustrates a block diagram of an exemplary environment suitable for providing buffer fullness reports from a client device to a host device.

FIG. 1 shows an exemplary environment 100 suitable for providing content or data packet flow information to a host device 102 from a client playback device or client device 104. In particular, buffer fullness reports (BFR) are provided by the client device 104 to the host device 102, where the BFRs include status of client device buffers that receive and process content or data packets.

The source or host device 102 generally provides access to digital data content (content), such as data files, media files, and/or live media content, such as a live cable TV feed or Webcast. Host device 102 streams the content to client device 104. For example, in the case of media content, client device 104 generally receives streaming content from host device 102 and renders or plays it back for a user. The content is streamed or sent over a network 106. Furthermore, requests from client device 104 for streaming content available on host device 102 may be routed from the client device 104 to the host device 102 via network 106. The host device 102 receives the request and streams the requested content to the requesting client device 104 via network 106. Network 106 may include various networks such as those incorporating IEEE 1394. In general, it is contemplated that network 106 may include any one of various packet switched networks. Host device 102 may be implemented as any of a variety of conventional computing devices, including, for example, a server, a desktop PC, a notebook or portable computer, a workstation, a mainframe computer, an Internet appliance, combinations thereof, and so on, that are configurable to stream stored and/or live media content to a client device 104. Client playback device 104 may also be implemented as any of a variety of conventional computing devices, including, for example, a desktop PC, a notebook or portable computer, a workstation, a mainframe computer, an Internet appliance, a gaming console, a handheld PC, a cellular telephone or other wireless communications device, a personal digital assistant (PDA), a set-top box, a television, combinations thereof, and so on. An exemplary computer for implementing a host device 102 and a client device 104 is described in more detail herein below with reference to FIG. 5.

Host device 102 can make any of a variety of data or content available for streaming to client device 104, including content such as audio, video, text, images, animation, and the like. The terms "streamed" or "streaming" are used to indicate that the data is provided over a network 106 to a client playback device 104 and that playback of the content can begin prior to the content being delivered in its entirety. The content may be publicly available or alternatively restricted (e.g., restricted to only certain users, available only if the appropriate fee is paid, restricted to users having access to a particular network, etc.). Additionally, the content may be "on-demand" (e.g., pre-recorded, stored content of a known size) or alternatively from a live "broadcast" (e.g., having no known size, such as a digital representation of a concert being captured as the concert is performed and made available for streaming shortly after capture).

Network 106 is intended to represent any of a variety of conventional network topologies and types (including optical, wired and/or wireless networks), employing any of a variety of conventional network protocols (including public and/or proprietary protocols). Network 106 may include, for example, a home network, a corporate network, or the Internet, IEEE 1394, as well as possibly at least portions of one or more local area networks (LANs) and/or wide area networks (WANs).

Exemplary host device 102 includes a central processing unit or processor 108, and a memory 110. Memory 110 includes an application 112 that may create or process content streamed to client device 104 over network 106. Furthermore, either processed and/or received (from another source) content may be stored in a content storage 114. In this implementation, content storage 114 is separate from memory 110. In other implementations, content storage 114 may be part of memory 110. A clock 116 provides one or more functions, including issuing a time stamp on each data packet streamed from host device 102.

Exemplary client device 104 includes a central processing unit or processor 118, and a memory 120. Memory 120 includes an application 122 that consumes or uses content received from sources such as host device 102. A jitter buffer 124 receives the data packets and acts as an intermediary buffer. Because of certain transmission issues including limited bandwidth and inconsistent streaming of content that lead to underflow and overflow situations, it is desirable to keep some content (i.e., data packets) in jitter buffer 124 in order to avoid glitches or breaks in streamed content, particularly when audio/video content is streamed.

In this implementation, a decoder 126 receives encoded data packets from jitter buffer 124, and decodes the data packets. In other implementations, a pre-decoder buffer (i.e., buffer placed before the decoder 126) may be incorporated. In certain cases, compressed data packets may be sent to and received by client device 104. For such cases, client device 104 may be implemented with a component that decompresses the data packets, where the component may or may not be part of decoder 126.

Decompressed and decoded data packets may be received and stored in a content buffer 128. In other implementations, two buffers may be placed before the decoder. A first buffer holds data packets that incorporate real time transport protocol (RTP), and a second buffer that only stores RTP data packet content (i.e., no RTP headers). The second buffer provides the content to be decoded by decoder 126. In other words, the first buffer holds data packets with RTP encapsulation (i.e., encapsulated data content) and the second buffer holds data packets without RTP encapsulation (i.e., de-encapsulated data content) for decoding. Content buffer 128 may include one or more buffers that store specific types of content. For example, there may be a separate video buffer to store video content, and a separate audio buffer to store audio content. Furthermore, the jitter buffer 124 may include separate buffers to store audio and video content.

Client device 104 includes a clock 130 to differentiate between data packets based on unique time stamps included in each particular data packet. In other words, clock 130 is used to play the data packets at the correct speed. In general, the data packets are played by sorting them based on time stamps that are included in the data packets and provided or issued by clock 116 of host device 102.

The client device 104 includes a buffer monitor 132 configured to monitor the fullness level of buffers 124 and 128, and to generate buffer fullness reports (BFR) 134 while content is streamed from host device 102. BFRs 134 provide buffer fullness information to the host device 102. In general, information conveyed in the BFRs 134 is used by the host device 102 to regulate or adjust the flow of content or data packets streamed to client device 104.

In the present embodiment, host device 102 includes a client buffer fullness (BFR) report module 136 configured to receive one or more BFRs 138 from one or more client devices such as client device 104. The BFRs 138 are unique to particular client devices. Each BFR 138 received and stored in client BFR report module 136 instructs host device 102 as to buffer information (i.e., fullness) at particular client buffers, including separate jitter buffers, content buffers, audio buffers, video buffers, etc. Host device 102 may compute the rate that content is transmitted (e.g., streamed) based on the buffer information in the BFRs 138.

The BFRs 134 may be sent out by client device 104 to indicate possible overflow or underflow situations. BFRs may also be sent regularly by client device 104. In certain cases, client device 104 may send BFRs 134 as part of a reply in a separate data stream. When a reply is made by the client device 104, such a reply may be in the form of a defined format or protocol. For example, if RTP, and specifically real time transport control protocol (RTCP) is used, control packets that are separate from data packets may be exchanged between the host device 102 and client device 104. Control packets from the client device 104 provide a feedback to the host device 102. The BFR 138 may be included in such a control packet.

Figure 2:
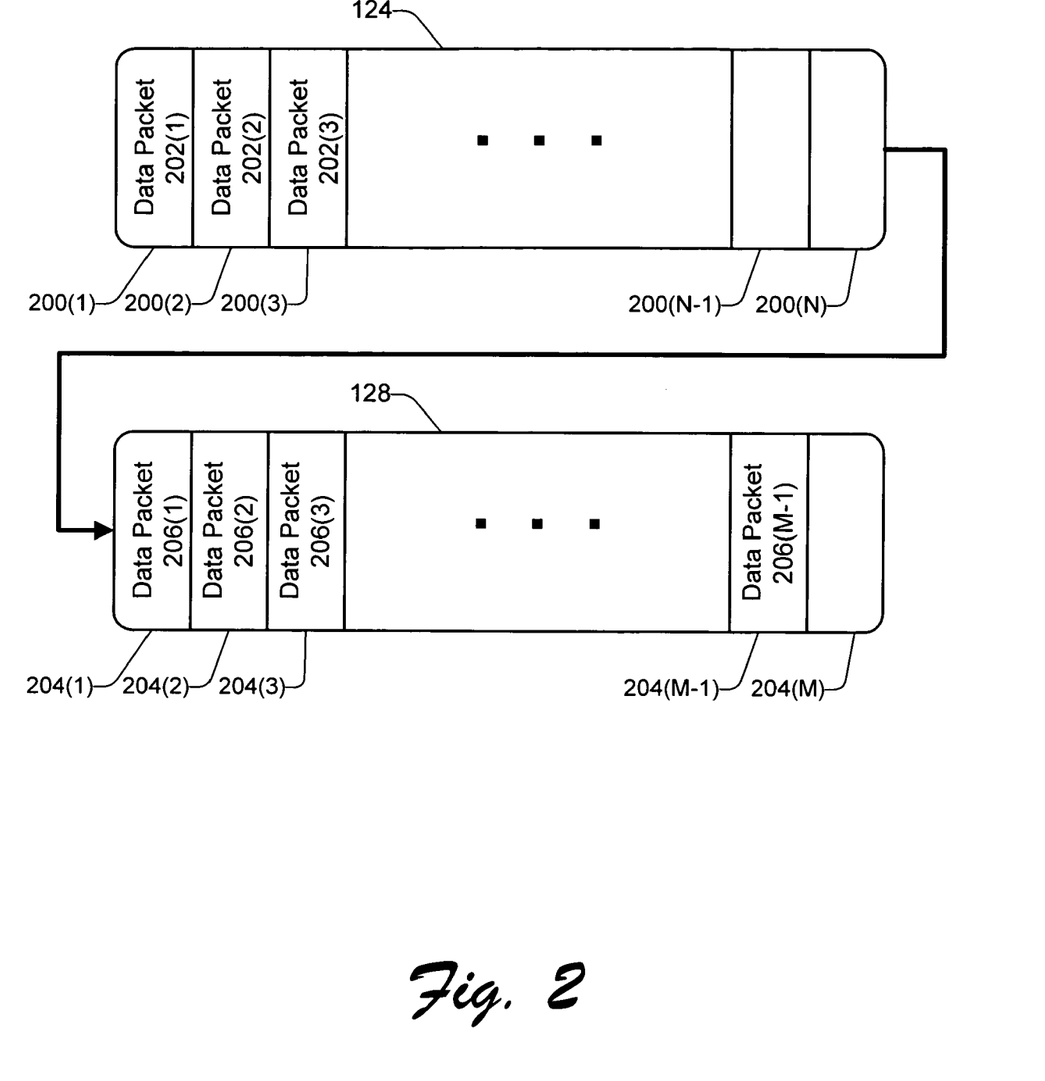
FIG. 2 illustrates a block diagram of an exemplary embodiment of a jitter buffer and content buffer that are included in a client device.

FIG. 2 shows example implementations of a jitter buffer and content buffer. In particular, jitter buffer 124 and content buffer 128 included in host device 104 are described in the implementations. Jitter buffer 124 includes N number of storage units 200, where each storage unit 200 may store a received data packet 202.

The storage units 200 are arranged in a first in first out (FIFO) structure so that data packets 202 that are first received are first sent to content buffer 128, or sent to a decoder (e.g., decoder 126) or other intermediary component (e.g., de-compressor). Although data packets 202 that are received first may be processed first, it is also possible that data packets 202 may be reordered in the network (i.e., lost). A received data packet then may be inserted in the content buffer 128 at an appropriate place and other data packets shifted.

Data packets 202 are stored in storage units 200, until they are sent along to content buffer 128 or other intermediary component. If the data packets 202 are not sent to content buffer 128, storage units 200 are filled up to storage unit 200(N) with data packets 202. The example illustrates a data packet 202(1) stored in storage unit 200(1), a data packet 202(2) stored in storage unit 202(2), and a data packet 202(3) stored in storage unit 200(3).

Jitter buffer 124 has a limited size which may be defined by the number of bytes that can be supported or stored. In addition, the limited size of jitter buffer 124 may de defined by a "time" size which translates to the total length of time of content that may be stored. The N number of storage units 200 is limited to the size of jitter buffer 124.

Content buffer 128 includes M number of storage units 204, where each storage unit 204 may store a data packet 206. Data packets 206 are expected to be decoded, uncompressed, and ready for rendering by an application (e.g., application 122 stored in memory 120 of client device 104). The number M may or may not be the same number as N. Furthermore, the size (i.e., byte size) of content buffer 128 may not be the same size of jitter buffer 124.

The storage units 204 of content buffer 128 are arranged in FIFO structure so that data packets 206 that are received first are processed first. Typically, a time stamp on each data packet 206 may be checked to determine when the data packet 206 is to be processed. Data packets 206 are stored in storage units 204 until they are sent along to content buffer 126 or other intermediary component. If the data packets 204 are not processed, storage units 204 may be filled up to storage unit 204(M) with data packets 206. The example illustrates a data packet 206(1) stored in storage unit 204(1), a data packet 206(2) stored in storage unit 204(2), a data packet 204(3) stored in storage unit 206(3), and a data packet 206(M-1) stored in storage unit 206(M-1).

Buffer fullness reports or BFRs (e.g., BFR 134 and 138) particularly describe at any given moment the maximum capacities (i.e., byte size or time size) of jitter buffer 124 and content buffer 128. However, it is noted that BFRs provide important information as to free space in buffers. In certain implementations, there may be more than one jitter buffer and/or content buffer in a client device. A BFR particularly describes the maximum capacities and free space of all such buffers. Furthermore, at any given time, the BFR describes how many storage units (e.g., storage units 200 and 204) are filled with data packets (e.g., data packets 202 and 206). The BFR may express "fullness" of buffers in terms of byte size and/or time as further discussed below.

Figure 3:
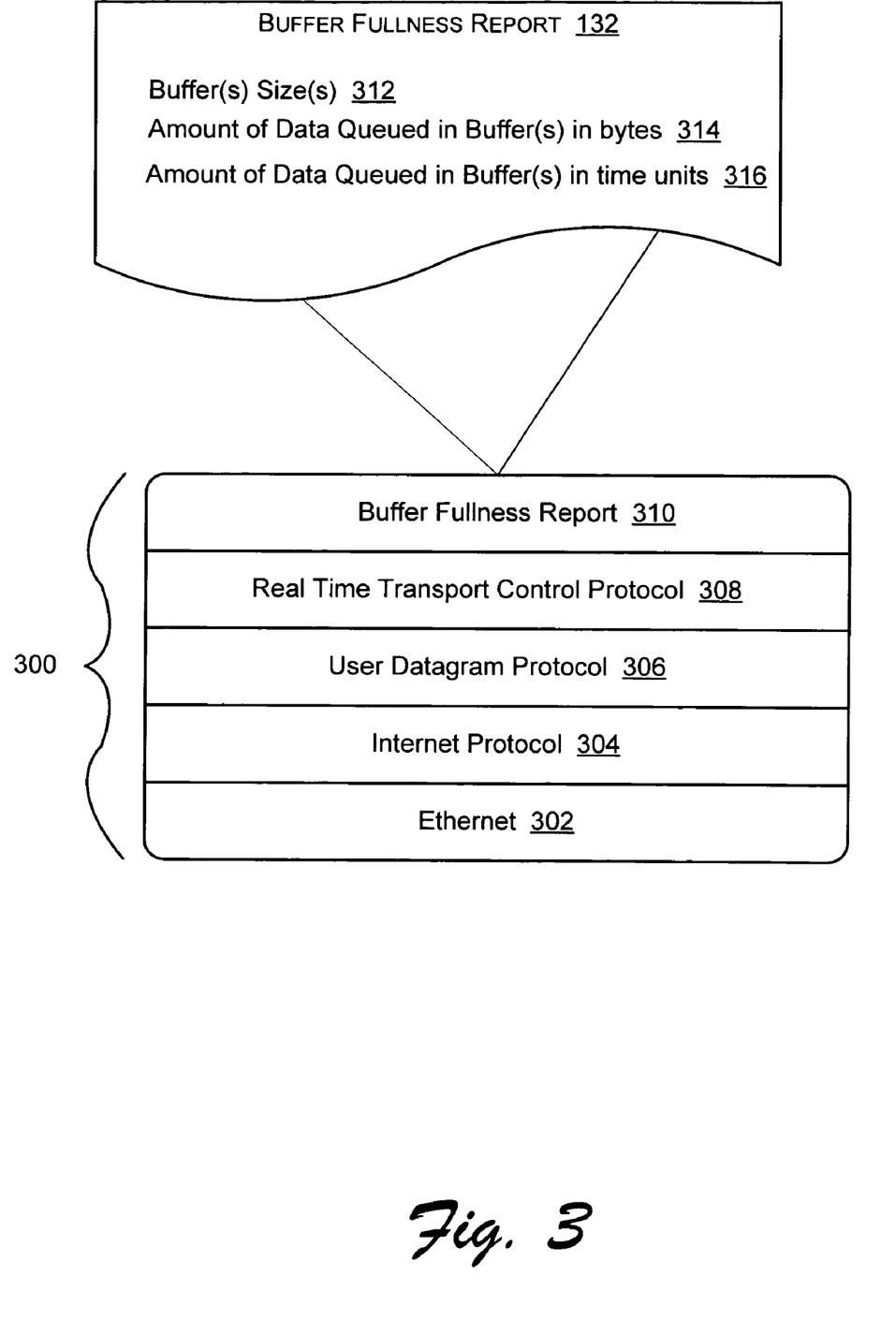
FIG. 3 illustrates a block diagram of an exemplary embodiment of a protocol stack and a buffer fullness report transmitted over the protocol stack.

FIG. 3 shows a protocol stack that supports transmission of BFRs and further shows particular information that may be provided by a BFR. A protocol stack 300 is a particular software implementation of a computer networking protocol suite. Such protocol stacks are well-known in the industry. In general lower levels of the protocol stack are designed to interact at the lowest levels of software and/or hardware between devices (e.g., host device 102 and client device 104).

In this example, the lowest protocol level of protocol stack 300 is the Ethernet level 302 which in general acts an "inter network" connection between host device 102 and client device 104. The next higher level is Internet protocol level 304 which is directed to communication in particular over the Internet. User datagram protocol (UDP) 306 level may be used to provide general broadcast or message communication. Real time transport control protocol (RTCP) or real time transport protocol (RTP) level 308 is particularly used to communicate real time data such as streaming content (e.g., multimedia). BFRs may be communicated over another higher level BFR level 310. The use of the level 310 allows BFRs to be communicated independent of the actual communication of content by the client device 104 from host device 102.

An exemplary BFR 132 includes buffer(s) size(s) 312, which may be for more than one buffer including jitter buffers and content buffers at the client device 104. In other words, BFRs are provided for all buffers that receive content either directly (i.e., jitter buffer 124) or indirectly (i.e., content buffer from host device 102). The unit of "bytes" may be used to express the amount of the amount of data 314 presently stored or queued in the buffers for processing. Alternatively, the amount of free space may be expressed. Furthermore, the unit of "time" may also be used to express the amount of data 316 presently stored or queued for processing in the buffers for processing. Information may be provided for individual buffers or for a group of buffers.

Figure 4:
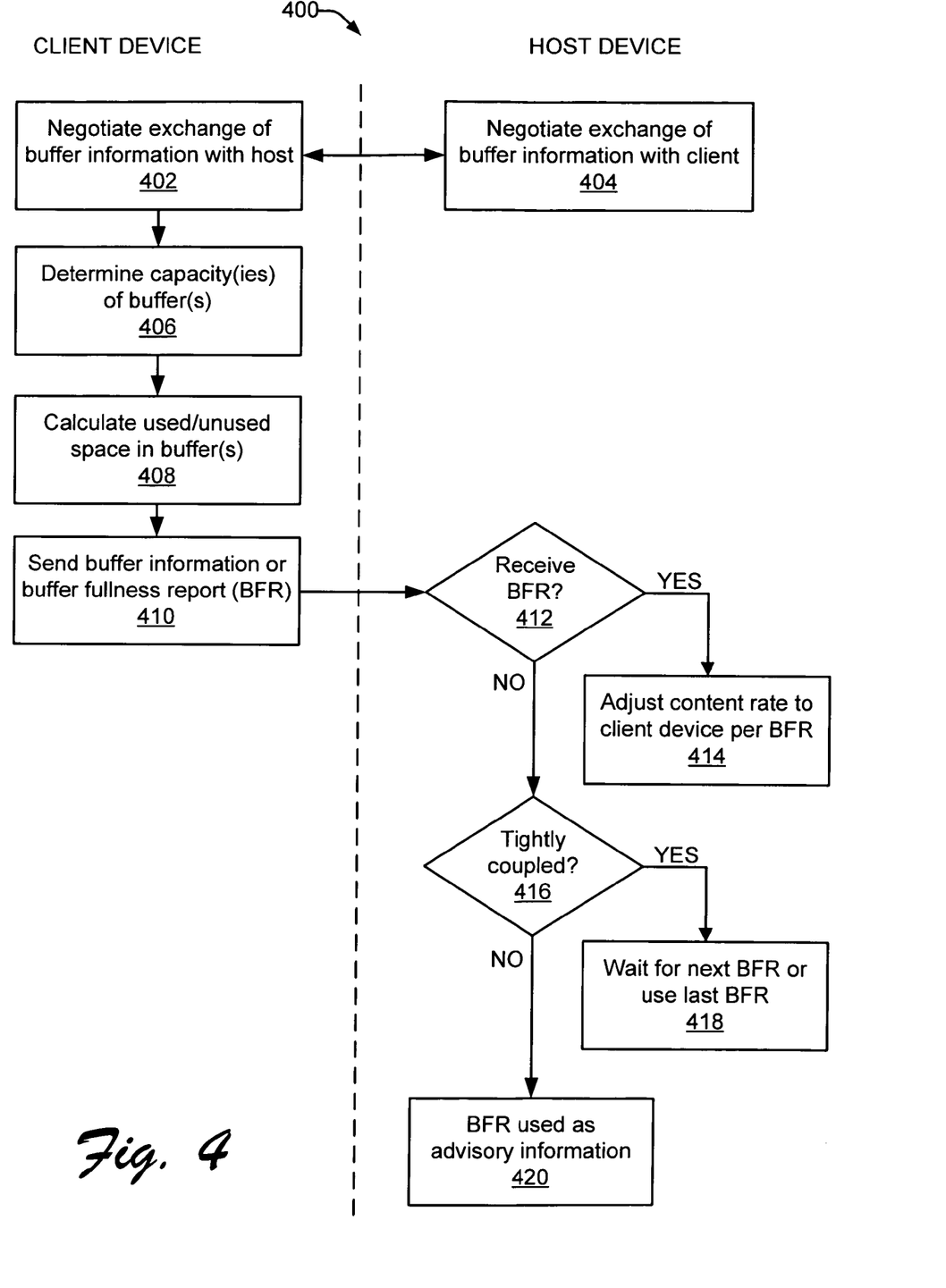
FIG. 4 is a flow diagram illustrating a process to inform a host device the buffer status of a client device.

FIG. 4 is a process 400 that informs a host device the buffer status of a client device. The process 400 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. The process 400 is described with reference to host device 102 and client device 104 described above. Although described as a flowchart, it is contemplated that certain processes may take place concurrently or in a different order.

At block 402, the client device negotiates with the host device as to how and what is exchanged regarding buffer information. The buffer information is in the form of a buffer fullness report (BFR) created at the client device and sent to the host device. The content of or information contained in the buffer fullness report can include the capacity or size of the buffers at the client device, the amount of space consumed at the buffers at a particularly instance, and information as to received content or data packets. Furthermore, negotiations between client device and host device may include determining a frequency as to how often buffer information or BFRs are sent from the client device to the host device. A greater frequency or rate of sending buffer information or BFRs allows improved adjustments in streaming of data packets such as content that includes media that prevent buffer underflow and overflow.

At block 404, the host device negotiates with the client device as to exchange of buffer information. The host device may provide capabilities of the host device as to exchanging buffer information, including maximum output (i.e., the ability to stream content or data packets) by the host device. Furthermore, the negotiating performed at blocks 402 and 404 may include identifying particular communication protocols used to communicate the buffer information or BFRs.

At block 406, the client device determines the capacities of all buffers that receive content or data packets from the host device. The determination may be performed on all buffers such as jitter buffer(s) and content buffer(s). In addition, the determination may be performed as to one or more size metrics such as byte size or time size. In certain cases, the determination may be made as to total capacity or collective capacity of buffers. For example, jitter buffer capacity may be combined with a content buffer capacity.

At block 408, the client device calculates used and unused space in the buffer(s). The calculation is performed for a particular instance of time, since it is expected that the client device continues to receive content or data packets. Byte size or time size may be used in calculation of used and unused space. The calculation that is measured, in relation to the capacity of the buffer(s), provides information as to whether additional content or data packets can be received (indicative of underflow) or whether no additional content or data packets can be received (indicative of overflow).

At block 410, the client device sends the buffer information, which may be in the form of a BFR. Separate BFRs may be sent for each stream. In other words, a BFR may be sent for an audio stream and another BFR may be sent for a video stream. In general, BFRs provide information as to all streams. The BFR may be transmitted as part of another report or communication packet such as a real time transport control protocol (RTCP) report from the client device. In certain cases, the BFR may be transmitted as a discrete and separate transmission. For example, the BFR may be communicated over a separate lower level communication protocol.

If the host device receives the BFR (i.e., following the YES branch of block 412), at block 414 the host device adjusts the flow or rate of content sent to the client device. The rate adjustment may be to transmission rate on a network and encoding bit rate of the content. For example, if the BFR indicates a high percentage of buffer capacity is used (i.e., an overflow situation), the host device slows the rate of content streamed to the client device. Alternatively, if the BFR indicates a low percentage of buffer capacity is used (i.e., an underflow situation), the host devices increases the rate of content streamed to the client device). Consideration may also be made for a deviation from an ideal or optimum buffer usage. In other words, no adjustments are made to the flow rate if the BFR indicates an acceptable plus or minus deviation or percentage from the optimum buffer usage. Multiple BFRs that provide information as to particular client buffers may be used by the host device to adjust flow to a specific client device. In other words the specific device may have multiple jitter buffers and content buffers, where each buffer has a particular BFR that is sent to the host device. From the BFR information, the host device may compute the rate of consumption per buffer and overall at the client device.

If a BFR is not received (i.e., following the NO branch of block 412), there may be two solutions to address the situation. If a tightly coupled solution is chosen (i.e., following the YES branch of block 416), a BFR exclusively dictates the flow of content from the host device to the client device. In other words, a tightly coupled solution involves the use of a BFR by the host device to throttle (i.e., stream) content to the client device. In a tightly coupled solution, the host device may transmit content until the client's buffers are full and then stop. The host device may resume transmission after a BFR indicates space is available in the client's buffer. If the BFR is not received, at block 418 the host device may use the information provided in a prior or last received BFR. Alternatively the host device may wait for the next or subsequent BFR. In the case of an initial transmission (i.e., no BFRs have been received), the host device may wait for the first BFR.

If a tightly coupled solution is not chosen, or in other words a loosely coupled solution is chosen (i.e., following the NO branch of block 416), at block 420 the BFR is used only as advisory information. In other words, if no BFR is received, as an example the host device may stream content or data packets based on a predefined rate (i.e., flow) or a calculated (i.e., inferred) based on previous BFR(s). In other cases, the host device may stream content or data packets based on the capacity of the host device. A loosely coupled solution uses the BFR as advisory information, wherein if no BFR is received, content may still be sent to the host device. The host device uses a BFR as a hint to throttle the flow. Since the host device may know the approximate rate (plus or minus clock drift) at which the client device will consume content in the buffer, the host device may not usually need to wait for a BFR before sending content.

Flow Control

Figure 5:
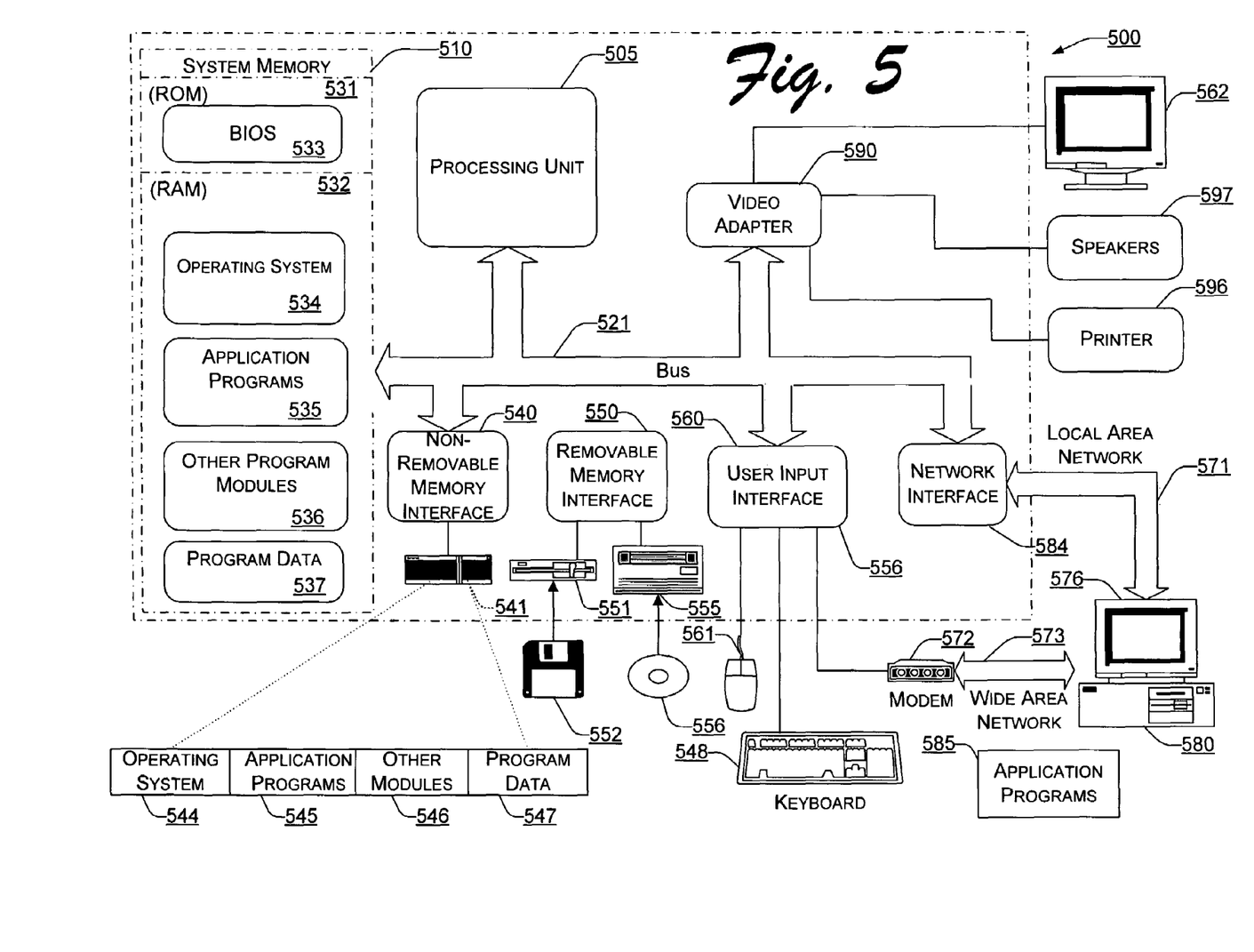
FIG. 5 illustrates an exemplary computing environment suitable for implementing a host device and client device such as those discussed with reference to FIGS. 1-4.

BFRs are directed to the general concept of flow control which is the stream transmission based on the number of buffers available on a client device. Flow control may be used to allow a host device to know exactly how many free buffers are available on the client device at any point in time ensuring that client device buffers do not overflow. As part of flow control, BFRs that are sent frequently to the host device can allow the host device to adjust its transmission rate to ensure the client device buffers do not become depleted and lead to glitches. In the event of network congestion or delays caused by errors in the network leading to conditions to reduce transmission rate, flow control and BFRS allow data to be sent at the correct rate. If a host device knows how much buffer space is available at a client, the host device may be able to fill up the available space quickly on stream startup or during discontinuities, and leading to results in higher performance. In the event of temporary network congestion, the host device can "catch-up" by delivering content faster and refilling the buffers of one or more clients. In general, the host device can ensure that client devices' jitter buffers are full for stored content, which provides for the client device to be more tolerant to network jitter and makes the system more robust Exemplary Computer FIG. 5 shows an exemplary computing device or computer 500 suitable as an environment for practicing aspects of the subject matter. In particular computer 500 describes in greater detail host device 102 and client device 104. Computer 500 is suitable as an environment for practicing aspects of the subject matter. The components of computer 500 may include, but are not limited to processing unit 505 (e.g., processors 108 and 118), system memory 510 (e.g., memories 110 and 120), and a system bus 521 that couples various system components including the system memory 510 to the processing unit 505. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Exemplary computer 500 typically includes a variety of computer-readable media. Computer-readable media can be any available media that can be accessed by computer 500 and includes both volatile and nonvolatile media, removable and non-removable media. By way of example, and not limitation, computing device-readable media may comprise computer storage media and communication media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by management server 500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computing device readable media.

The system memory 510 includes computing device storage media in the form of volatile and/or nonvolatile memory such as read only memory (ROM) 531 and random access memory (RAM) 532. A basic input/output system 533 (BIOS), containing the basic routines that help to transfer information between elements within computer 500, such as during start-up, is typically stored in ROM 531. RAM 532 typically contains data and/or program modules that are immediately accessible to and/or presently being operated on by processing unit 505. By way of example, and not limitation, FIG. 5 illustrates operating system 534, application programs 535 (which may include applications 112 or 122), other program modules 536, and program data 537. Other program modules 536 may include components such as buffer monitor 132 and client BRF report module 136.

The computer 500 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computing device storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface such as interface 550.

The drives and their associated computing device storage media discussed above and illustrated in FIG. 5 provide storage of computer-readable instructions, data structures, program modules, and other data for computer 500. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the exemplary computer 500 through input devices such as a keyboard 548 and pointing device 561, commonly referred to as a mouse, trackball, or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port, or in particular a USB port.

A monitor 562 or other type of display device is also connected to the system bus 521 via an interface, such as a video interface 590. In addition to the monitor 562, computing devices may also include other peripheral output devices such as speakers 597 and printer 596, which may be connected through an output peripheral interface 595.

The exemplary computer 500 may operate in a networked environment using logical connections to one or more remote computing devices, such as a remote computing device 580. The remote computing device 580 may be a personal computing device, a server, a router, a network PC, a peer device or other common network node, and typically includes many or all of the elements described above relative to computer 500. The logical connections depicted in FIG. 5 include a local area network (LAN) 571 and a wide area network (WAN) 573, but may also include other networks such as network 106 described above. Such networking environments are commonplace in offices, enterprise-wide computing device networks, intranets, and the Internet.

When used in a LAN networking environment, the exemplary management server 500 is connected to the LAN 571 through a network interface or adapter 570. When used in a WAN networking environment, the exemplary computer 500 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the exemplary computer 500, or portions thereof, may be stored in a remote memory storage device. By way of example, and not limitation, FIG. 5 illustrates remote application programs 585. It will be appreciated that the network connections shown are exemplary and other means of establishing a communications link between the computing devices may be used.

CONCLUSION

The above-described methods and computer describe providing buffer fullness reports from a client device to a host device. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented on a computing device using instructions executable by a processor, the method comprising:
    determining maximum capacity of a plurality of buffers at a client playback device, wherein the maximum capacity is described in buffer information, wherein the plurality of buffers receive streaming content from a host device, and the plurality of buffers comprise at least one of: jitter buffers, content buffers, audio buffers, or video buffers;
    calculating available space in the plurality of buffers of the client playback device for a particular instance of time while content is streamed from the host device, wherein the available space is described in the buffer information;

sending the buffer information to the host device which allows the host device to adjust flow of streaming content to the client playback device based on the buffer information, wherein sending the buffer information comprises sending the maximum capacity and the available space of the plurality of buffers; and indicating a high percentage of buffer capacity of the plurality of the buffers is used, the host device slows a rate of content streamed to the client playback device, and indicating a low percentage of the buffer capacity of the plurality of the buffers is used, the host device increases the rate of content streamed to the client playback device, wherein the buffer information for the client playback device is unique to the client playback device and the buffer information instructs the host device as to a fullness of a particular buffer of the plurality of buffers.

2. The method of claim 1 wherein the determining is performed on all buffers that receive the streaming content.

3. The method of claim 1 wherein the calculating the available space resolves in one or more of the following: used space and free space; wherein the available space is expressed in bytes or time units.

4. The method of claim 1 wherein the sending the buffer information is in the form of a buffer fullness report.

5. The method of claim 1 further comprising negotiating an exchange of the buffer information.

6. The method of claim 5 wherein the negotiating includes determining frequency as to how often the buffer information is sent to the host device.

7. The method of claim 5 wherein the negotiating includes identifying a communication protocol used to communicate the buffer information.

8. One or more computer-readable storage media comprising computer-executable instructions that, when executed, perform the method as recited in claim 1.

9. A method implemented at a host device using instructions executable by a processor, the method comprising:

negotiating exchange of buffer information with a client playback device, wherein the buffer information comprises maximum capacity of one or more buffers at the client playback device and available space in the one or more buffers of the client playback device for a particular instance of time while content is streamed from the host to the client playback device, and wherein the buffer information is unique to the client playback device;

receiving the buffer information from the client playback device; and adjusting the rate of content streamed from the host device to the client playback device based on the buffer information, wherein when the buffer information indicates a high percentage of buffer capacity of the one or more buffers at the client playback device is used, the host device slows a rate of content streamed to the client playback device, and when the buffer information indicates a low percentage of the buffer capacity of the one or more buffers at the client playback device is used, the host device increases the rate of content streamed to the client playback device.

10. The method of claim 9 wherein the negotiating includes determining a frequency as to how often the buffer information is received from the client playback device.

11. The method of claim 9 wherein the adjusting is based on a deviation from an optimum buffer usage value.

12. The method of claim 9 wherein the adjusting performs one or more of the following: adjusting transmission rate on a network and adjusting the encoding bit rate of the content.

13. The method of claim 9 further comprising waiting for a subsequent buffer information or using a prior buffer information in the event the buffer information is not received.

14. The method of claim 9 further comprising streaming content to the client playback device based on a predetermined rate or derived rate from prior buffer information in the event the buffer information is not received.

15. One or more computer-readable storage media comprising computer-executable instructions that, when executed, perform the method as recited in claim 9.

16. A computer comprising:

a processing unit;

a client playback application to consume streamed content;

one or more buffers that are accessible by and operated on by the processing unit, wherein the buffers receive streamed content from one or more sources; and a buffer monitor that is accessible by and operated on by the processing unit, wherein the buffer monitor monitors the fullness level of the buffers, and generates buffer fullness reports based on the fullness level of the buffers in response to a negotiated frequency as to how often buffer fullness reports are to be sent to a host device by the computer, and wherein the buffer fullness reports comprise maximum capacity of the one or more buffers and available space in the one or more buffers, wherein a buffer fullness report is generated for a particular instance of time while content is streamed to the computer, wherein the buffer fullness report is unique to the computer, wherein the buffer fullness report instructs the host device as to the fullness level of a particular buffer of the buffers.

17. The computer of claim 16 wherein the buffers comprise an intermediary jitter buffer and a content buffer.

18. The computer of claim 16 wherein the buffers comprise a first buffer that stores encapsulated data content and a second buffer stores de-capsulated data content for decoding.

19. The computer of claim 16 wherein the buffer fullness reports are sent to a host device using a particular communication protocol.

20. The computer of claim 17 further comprising a decoder prior to the content buffer.

* * * * *